United States Patent
Betarbet et al.

(10) Patent No.: US 7,844,443 B2
(45) Date of Patent: Nov. 30, 2010

(54) NETWORK SUBSCRIBER EXPERIENCE MODELING

(75) Inventors: Sandeep Betarbet, Lilburn, GA (US); Jeffrey Neumann, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 954 days.

(21) Appl. No.: 11/673,840

(22) Filed: Feb. 12, 2007

(65) Prior Publication Data

US 2008/0195728 A1 Aug. 14, 2008

(51) Int. Cl.
*G06F 7/60* (2006.01)
*G06F 9/45* (2006.01)
*G06F 15/173* (2006.01)
*G01N 37/00* (2006.01)

(52) U.S. Cl. .............................. 703/22; 703/2; 709/224; 702/84

(58) Field of Classification Search ...................... 703/2, 703/22; 709/224; 702/84
See application file for complete search history.

(56) References Cited

U.S. PATENT DOCUMENTS

| 6,807,156 | B1 * | 10/2004 | Veres et al. ................. 370/252 |
| 7,339,897 | B2 * | 3/2008 | Larsson et al. .............. 370/252 |
| 2005/0163047 | A1 * | 7/2005 | McGregor et al. .......... 370/229 |
| 2007/0299746 | A1 * | 12/2007 | Haley et al. .................. 705/28 |

OTHER PUBLICATIONS

"Delivering QoS Requirements to Traffic with Diverse Delay Tolerances in a TDMA Environment" Jeffrey M. Capone, IEEE, Feb. 1999.*

* cited by examiner

*Primary Examiner*—Paul L Rodriguez
*Assistant Examiner*—Nithya Janakiraman
(74) *Attorney, Agent, or Firm*—Thomas, Kayden, Horstemeyer & Risley, LLP

(57) ABSTRACT

Systems and methods for modeling a subscriber network experience. In one embodiment, a method includes the act of receiving a plurality of subscriber metrics associated with a subscriber to an access network. The method also includes the act of modeling the subscriber experience by applying at least one transformation to the plurality of subscriber metrics to produce a set of subscriber experience data. The metrics measure quality of service for a subscriber experience with the access network. Each element of the subscriber experience data quantifies an aspect of the subscriber experience.

21 Claims, 9 Drawing Sheets

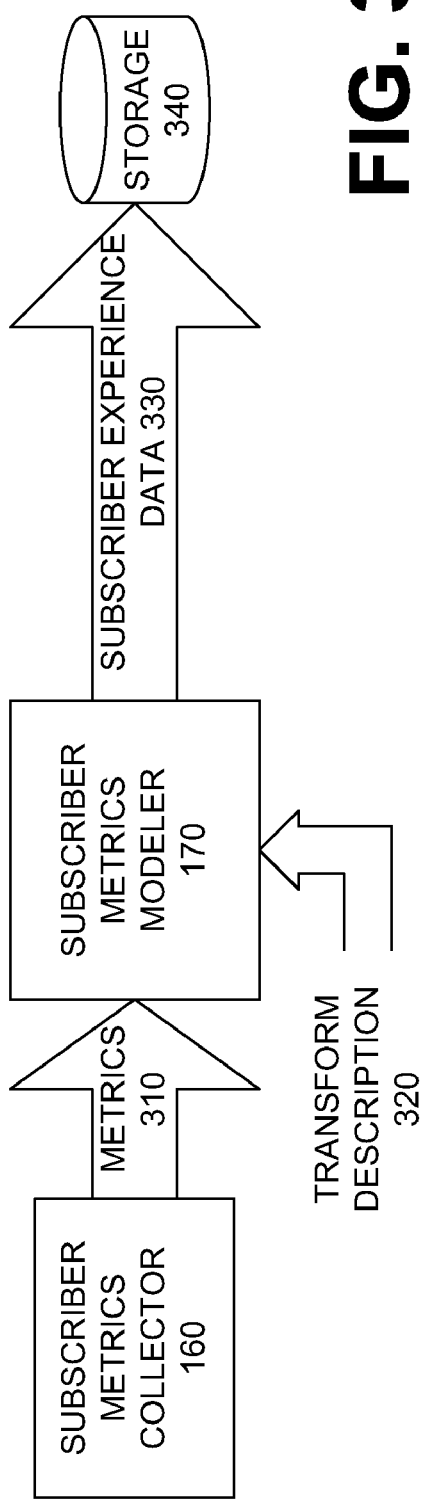
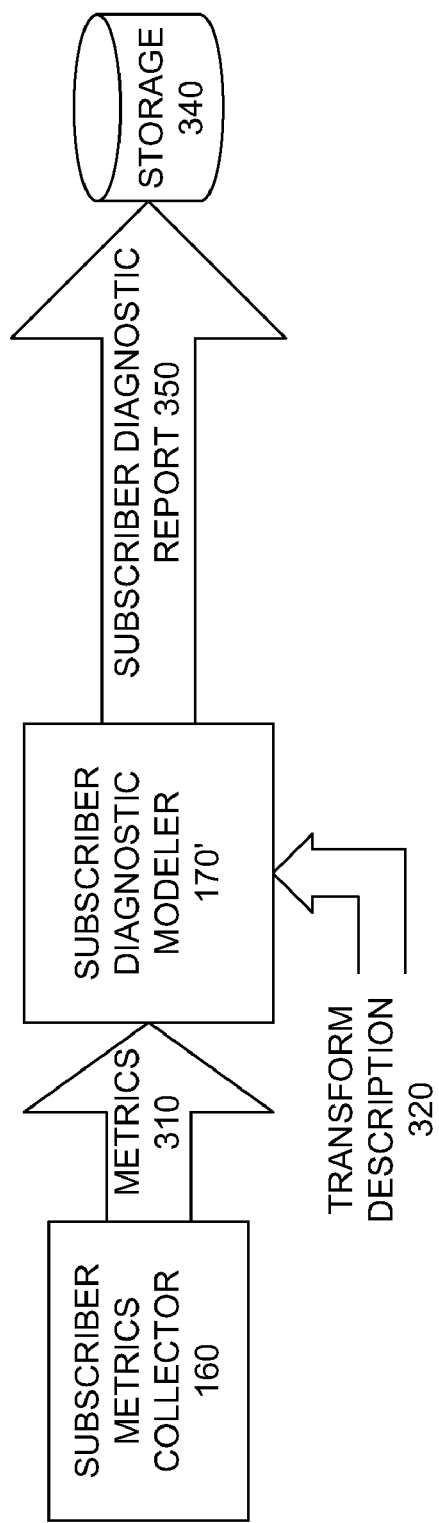

NETWORK SUBSCRIBER EXPERIENCE MODELING

FIELD OF THE DISCLOSURE

The present disclosure relates to computer networks, and more specifically, to diagnosing subscriber problems in a computer network.

BACKGROUND

Through the Internet, users have access to other computers located anywhere in the world. Users in many types of settings, from home to business to educational, typically connect to the Internet through an access network. In this disclosure, users are referred to as subscribers of the access network, or simply subscribers. When a subscriber has difficulty in connecting to the Internet, the access network provider typically follows a troubleshooting process to determine the source of the problem, which may be with the customer's equipment, with the provider's equipment, or with the Internet itself. A similar process is typically followed when the subscriber has a working connection, but is experiencing degraded performance.

A typical troubleshooting process used by the access network provider starts by gathering information about the status and performance of individual network components within the access network, and at the subscriber's site. The information is then analyzed, using a combination of computerized tools and human judgment. The desired result of the analysis is to identify a particular action which the subscriber or the access network provider can take to resolve the problem. For example, a recommended action for the customer may be to reset the modem or run a virus scan, while a recommended action for the provider may be to increase bandwidth on a virtual circuit in the provider's network.

The conventional troubleshooting process suffers from information overload: there is simply too much information to make sense of using conventional tools, even automated ones. The collected information typically includes thousands of component status codes and events gathered over a period of time. A problem with one component often has side effects on other components, making the diagnosis more difficult.

The conventional troubleshooting process is also reactive, addressing the subscriber's experience with the network only when a subscriber has a negative experience. A proactive process which monitored subscriber usage and periodically determined the quality of the subscriber's network experience could instead notice a change in the subscriber's quality of experience, and address the anomaly before it became a problem noticed by the subscriber. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 3A and 3B are data flow diagrams showing data flow for exemplary embodiments of the subscriber experience modeler of FIGS. 1 and 2.

SUMMARY

Embodiments of the present invention include a method for modeling a subscriber network experience. In this regard, embodiments of the method can be broadly summarized by the following acts: receiving a plurality of subscriber metrics associated with a subscriber to an access network; and modeling the subscriber experience by applying at least one transformation to the plurality of subscriber metrics to produce a set of subscriber experience data. The metrics measure quality of service for a subscriber experience with the access network. Each element of the subscriber experience data quantifies an aspect of the subscriber experience.

The systems can also be viewed as a system for modeling a subscriber network experience. The system includes at least one memory having stored thereon program code, and at least one processor programmed by the program code. The processor is programmed by the program code for at least receiving a plurality of subscriber metrics associated with a subscriber to an access network, and modeling the subscriber experience by applying at least one transformation to the plurality of subscriber metrics to produce a set of subscriber experience data. The metrics measure quality of service for a subscriber experience with the access network. Each element of the subscriber experience data quantifies an aspect of the subscriber experience.

The system can also be viewed as a computer-readable medium containing instructions for performing a method of displaying an e-mail message having at least one recipient. In this regard, embodiments of the method can be broadly summarized by the following acts: receiving a plurality of subscriber metrics associated with a subscriber to an access network; and modeling the subscriber experience by applying at least one transformation to the plurality of subscriber metrics to produce a set of subscriber experience data. The metrics measure quality of service for a subscriber experience with the access network. Each element of the subscriber experience data quantifies an aspect of the subscriber experience.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
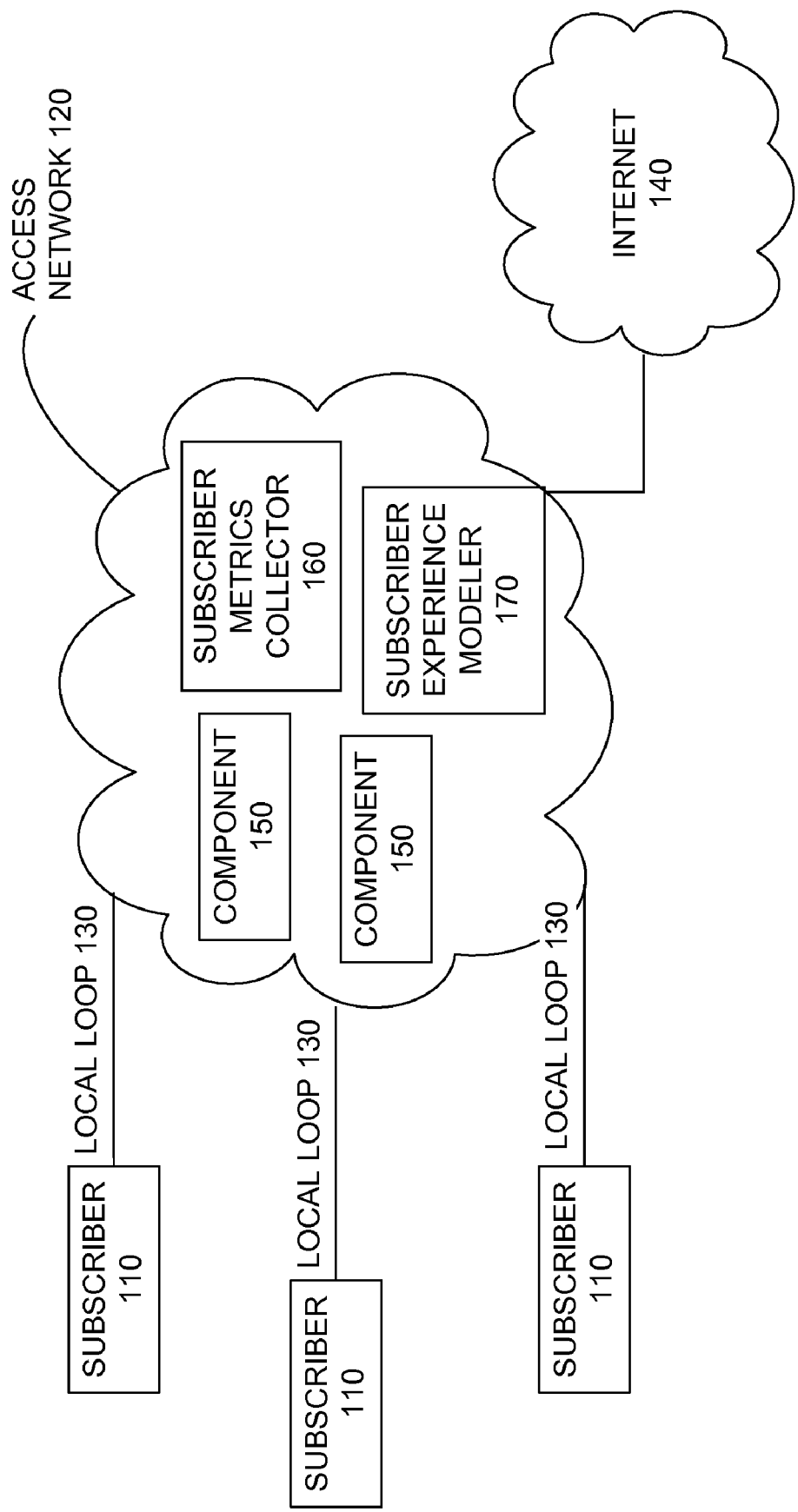
FIG. 1 is a block diagram of an environment in which one embodiment of a system and method for network subscriber experience modeling is located.

FIG. 1 is a block diagram 6 of an environment in which one embodiment of a system and method for network subscriber experience modeling is located. Subscriber equipment 110 is connected to an access network 120 through local loops 130. The access network 120 may be operated, for example, by a local phone company, a cable television provider, a wireless phone provider, other known telecommunications providers, etc. The local loops 130 (also known as "subscriber loops") may be implemented using a variety of technologies, for example, digital subscriber loop (DSL), hybrid fiber coax (HFC), and others.

The access network 120 is connected to the Internet 140, and Subscriber equipment 110 accesses Internet 140 through the access network 120. The access network 120 contains one or more network components 150 that work together to transport data traffic between Subscriber equipment 110 and the Internet 140. The access network 120 also contains a subscriber metrics collector 160 which monitors the components 150 to gather metrics measuring the subscriber's quality of service. These metrics measure subscriber traffic and usage of resources of the components 150. Examples of these metrics include information about networking and computer equipment at the subscriber location, status of the local loop 130, status of components 150, status of links on these components 150, packet statistics for traffic within and the access network 120, and events describing deviations from expected behavior on the local loop 130 and at the components 150.

A subscriber experience modeler 170 obtains metrics from the subscriber metrics collector 160, and uses this information to model a subscriber's experience with the access network 120. The model takes different forms in various embodiments of the subscriber experience modeler 170, as will be described later in connection with FIGS. 3A and 3B. The process used by the subscriber experience modeler 170 will be described later in connection with FIGS. 6-9.

Figure 2:
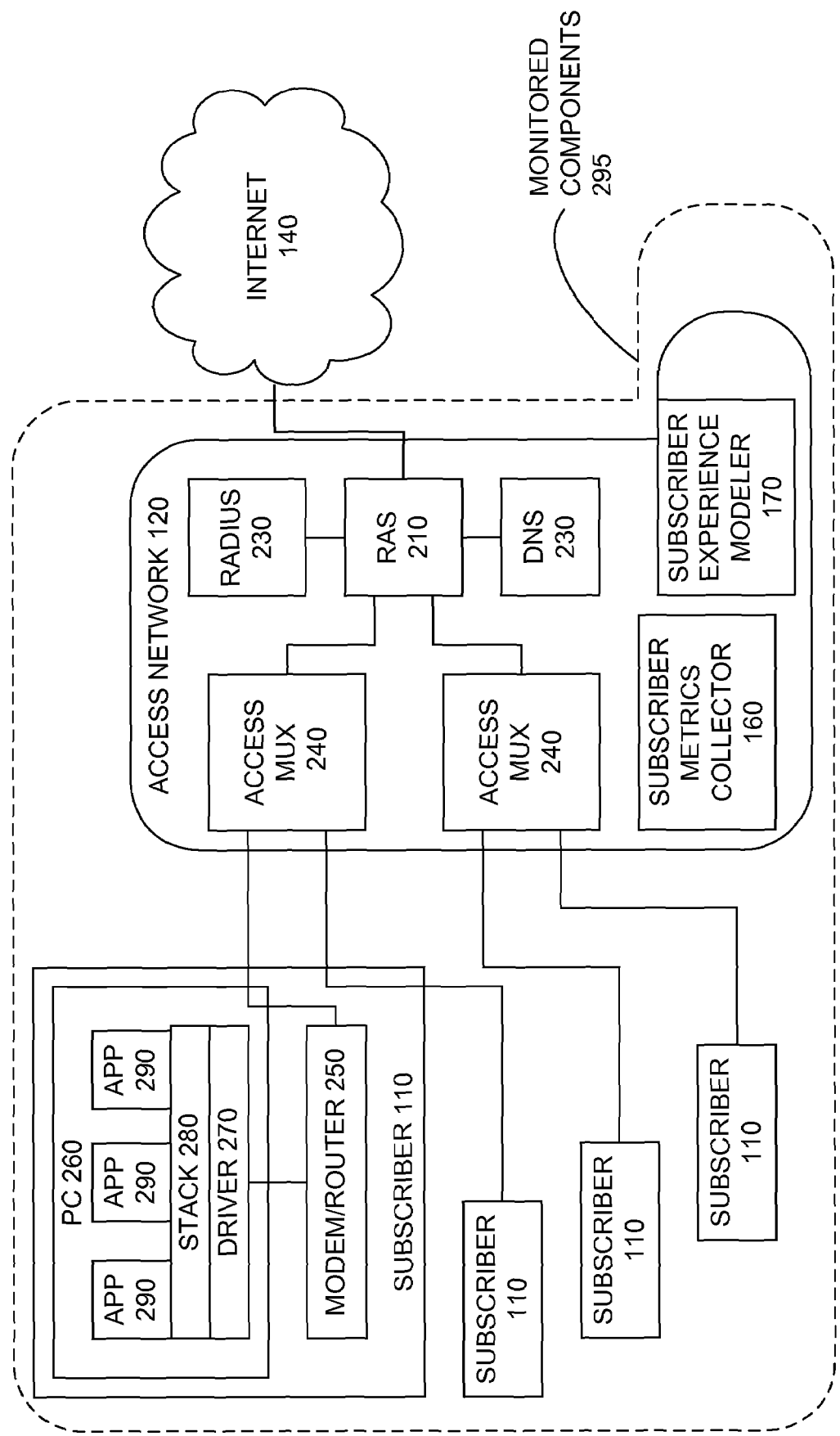
FIG. 2 is a more detailed view of the environment of FIG. 1.

FIG. 2 is a more detailed view of the environment of FIG. 1 in accordance with an exemplary embodiment of the invention. The access network 120 also includes subscriber metrics collector 160 and subscriber experience modeler 170, as previously illustrated, as well as components 150 such as a remote access server (RAS) 210, a domain name server (DNS) 220, a remote access authentication server (RADIUS) 230, and one or more access multiplexers 240. A person of ordinary skill in the art should understand that the components shown in FIG. 2 are merely examples, and other components of an access network are also contemplated and intended to be within the scope of this disclosure.

The access multiplexer 240 aggregates or concentrates traffic to/from multiple subscriber loops 130. A typical access multiplexer 240 includes many slots, and each slot represents many virtual ports. Traffic from multiple access multiplexers 240 is aggregated by remote access server 210. The remote access server 210 forwards Layer-3 (IP) packets to a destination within the Internet 140. Because access multiplexers 240 typically use a different Layer-2 frame format than do edge devices on Internet 140, forwarding performed by the remote access server 210 may involve stripping off one type of Layer-2 frame and adding another. The RADIUS 230 provides authentication, authorization and accounting for subscribers who connect to the access network 120. The DNS 220 provides IP addresses for named destinations requested by network devices at the subscriber 110.

As described above, subscriber metrics collector 160 monitors components 150 within access network 120 and collects statistics, status information, error events, etc. which describe a subscriber's experience. Subscriber metrics collector 160 also gathers information about Subscriber equipment 110, which includes one or more network devices and/or network software that reside at a subscriber location. Exemplary subscriber devices shown in FIG. 2 are a modem/router 250 and a personal computer (PC) 260. Software executing on the PC 260 includes a network driver 270, a protocol stack 280, and applications 290A, 290B, 290C. The network components and subscriber devices that are monitored by subscriber metrics collector 160, and available for analysis by subscriber experience modeler 170, are shown in FIG. 2 as group 295.

FIGS. 3A and 3B are data flow diagrams showing data flow for exemplary embodiments of subscriber experience modeler 170 and subscriber experience modeler 170'. The embodiment of FIG. 3A, the output of the subscriber experience modeler 170 is a single value which quantifies the experience of a subscriber 110. The embodiment of FIG. 3B, the output of the subscriber experience modeler 170' is a set of multiple diagnostic values which identify a suspected root cause of a problem experienced by a subscriber 110.

In the embodiment of FIG. 3A, subscriber metrics collector 160 provides the subscriber experience modeler 170 with a set of subscriber metrics 310. As described earlier, these metrics describe the quality of service experienced by a subscriber. The subscriber experience modeler 170 treats the metrics 310 as a set of vectors, and applies one or more transformations 320 to the vector metrics 310.

The transformations 320 reduce a large set of metrics 310 to a single subscriber experience score 330, which quantifies the subscriber's experience with the access network 120. In the example of FIG. 3A, subscriber experience score 330 is stored (340) for later use. This allows data to be gathered for more than one subscriber, or for an extended period of time. In another embodiment, the subscriber experience score 330 can be viewed by a browser.

Various transformations 320 are used in different embodiments of subscriber experience modeler 170. In some embodiment, at least one of the transformations 320 calculates the contribution made by each metric 310 to the subscriber experience. In some embodiments, at least one of the transformations 320 takes into account a correlation between network components 150.

In the embodiment of FIG. 3B, the modeler acts as a subscriber diagnostics modeler 170'. The subscriber diagnostics modeler 170' takes as input the set of set of subscriber metrics 310 and applies a set of transformations 320 to the metrics 310 to produce a set of diagnostic values 350 and a network component associated with each diagnostic value. In one embodiment of subscriber diagnostics modeler 170', a low number for a particular diagnostic value in the set of diagnostic values 350 indicates that the associated network component is the suspected root cause. In another embodiment, a high number indicates that the associated network component is the suspected root cause.

In some embodiments of modeler (170, 170') the input metrics 310 are XML documents, the transformations 320 take the form of XSLT style sheets, and the modeler (170, 170') is an XSLT processor. In one of these embodiments, each individual transformation 320 is represented by a different XSLT style sheet, and the XML produced by one transformation style sheet is provided as input to the next style sheet. A person of ordinary skill in the art should understand that an XSLT style sheet includes a set of rules, each of which contains a match condition and a list of instructions to be carried out. Such a person should also be familiar with the use of XSLT style sheets to convert or transform data between XML documents which use different schemas.

Figure 4:
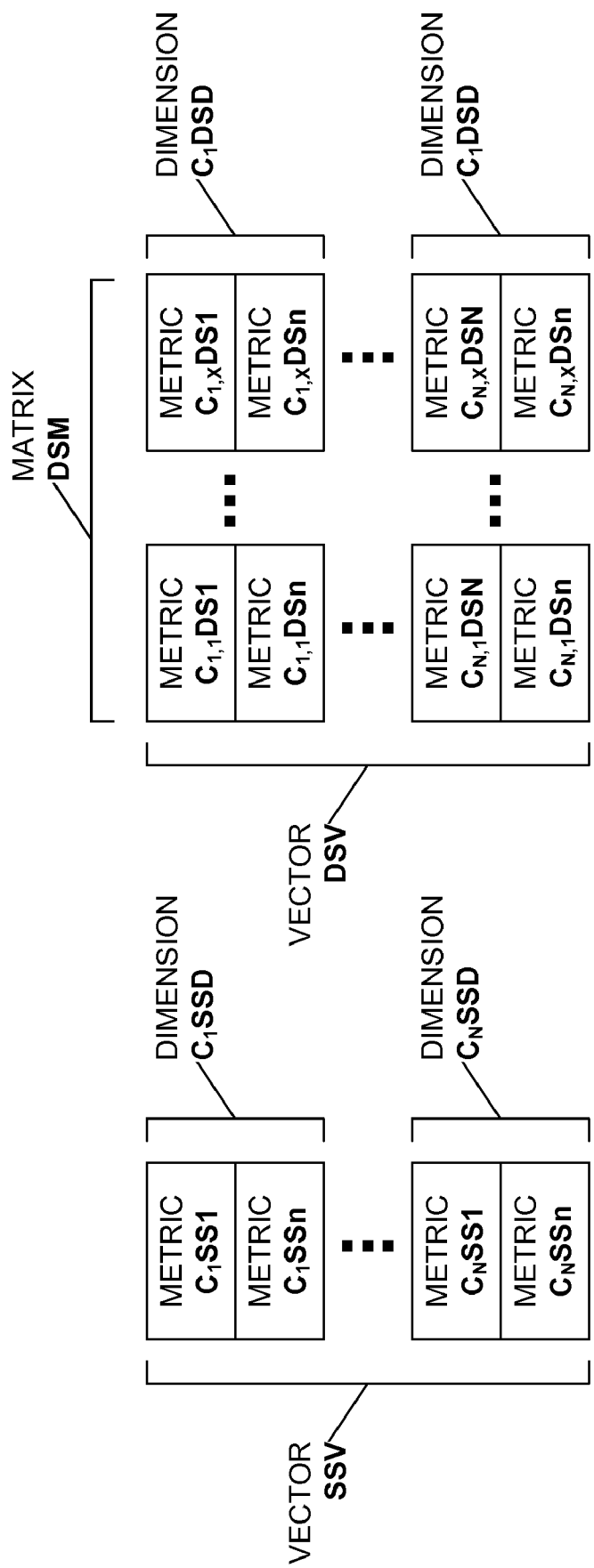
FIG. 4 illustrates a vector view of the subscriber metrics of FIG. 3, as used by some embodiments of the subscriber experience modeler of FIGS. 1, 2, and 3.

FIG. 4 illustrates a vector view of subscriber metrics 310, as used by some embodiments of subscriber experience modeler 170. Each of components 150 and subscriber equipment 110 supplies metrics 310 to subscriber experience modeler 170. The metrics 310 are of three types: service metrics, which measure quality of service delivered by a component or device; degradation metrics, which measure a decline in the quality of service from a component or device; and frequency degradation metrics, which measure the frequency of the degradation. These three types are referred to as different "spaces": service metrics exist in "service space" while network degradation metrics exist in both "degradation space" and "degradation frequency space". Service space represents the service level of individual network components. Degradation space represents the degradation of individual network components, while degradation frequency space represents the frequency of degradation.

Metrics are collectively represented herein by vectors and matrices. As used herein, a vector is a collection of metrics, or measured values, from different dimensions of the space in question. The metrics of each dimension form a set and are represented as a dimensional value in the vector. In the example of FIG. 4, the vector SSV is shown with two dimensions, $C_1SSD$ and $C_NSSD$. Each dimension of a vector corresponds to a type of network component. Each dimension represents the combined effect of all network components of a single type on the vector.

As an example, in FIG. 4, the dimension $C_1SSD$ represents the effect that components $C_1SS1$ through $C_1SSn$ (components of the first type) have on the vector SSV, while the dimension $C_2SSD$ represents the effect that components $C_2SS1$ through $C_2SSk$ (components of the second type) have on the vector SSV. Viewed another way, the vector SSV is composed of such dimensions for all components: $(\{C_1SS1 \ldots C_1SSn\}, \{C_2SS1 \ldots C_2SSn\} \ldots \{C_NSS1 \ldots C_NSSn\})$. An equivalent representation of the vector SSV omits the individual components, and includes only the dimensions: $\{C_1SSD, C_2SSD \ldots C_NSSD\}$.

The vector names used herein include a network component identifier, a space identifier ("S" for service, "D" for degradation, "F" for frequency), and the letter "V" for vector. The name of a particular metric represented in a vector includes a network component identifier, a space identifier, and index within the vector dimension: "$C_1SS1$" refers to a metric from the first type of network component ("$C_1$"), in service space ("SS"), from the first dimension ("1").

Degradation space includes metrics which affect each other. As one example, a round trip time metric can affect an error rate metric, and vice versa, so both of these metrics would appear in degradation space. The individual metrics obtained from a particular component X, which affect only component X, are identified as $\{C_{XX}DS1 \ldots C_{XX}DSn\}$. These metrics—from X affecting only X—are combined into a dimension of the Degradation vector for X: $C_{XX}DSD$. Similarly, degradation metrics for component X obtained as a result of activity in component Y are represented as another dimension: $\{C_{XY}DS1 \ldots C_{XY}DSn\} = C_{XY}DSD$.

Degradation vectors, which are one-dimensional, are combined into a two-dimensional degradation space matrix which captures the effect of each component on each of the other components. In other words, the degradation space matrix is composed of all degradation vectors. Degradation metrics affecting a particular component can be found by combining dimensions: all degradation metrics affecting component X are found in the following combination of dimensions: $C_{X1}DSD, C_{X2}DSD, C_{X3}DSD \ldots C_{XN}DSD$.

Some metrics have meaning in the value of the metric itself: an error count conveys meaning, as does an alert event. Other metrics have meaning, or have additional meaning, in their timing or frequency. For example, an alert event itself conveys something, and the presence of N alert events in a given time period conveys something else. In the systems and methods disclosed herein, such metrics appear in a degradation frequency vector, which in some embodiments is computed from a set of degradation frequency vectors, each containing timestamp information.

A person of ordinary skill in the art should recognize that vectors and matrices can be operated on mathematically. However, performing operations directly on vectors may not always be appropriate, since metrics may vary a great deal in their semantics. For example, a good subscriber experience may be represented by a high value in one metric and a low value in another, and a metric with a value of 10 and another with a value of 100 may both represent an excellent subscriber experience. For this reason, the systems and methods disclosed herein use scaling. A person of ordinary skill in the art should recognize there are many ways to scale dissimilar metrics so they can be compared, operated on, and/or transformed appropriately. One such scaling technique will be described below, but other scaling techniques are also intended to be within the scope of this disclosure.

Figure 5:
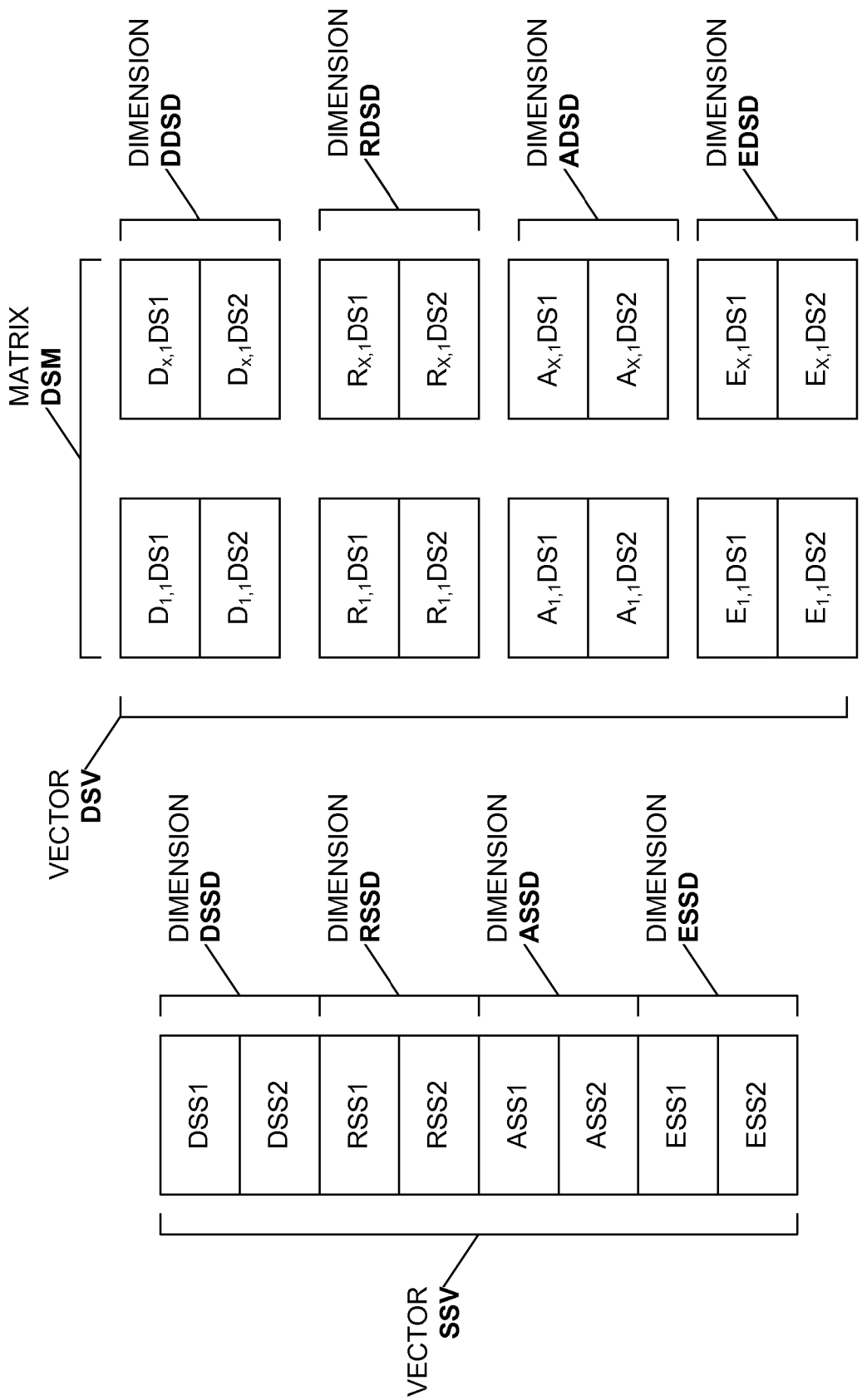
FIG. 5 illustrates a vector view of the subscriber metrics of FIG. 3, as used by some embodiments of the subscriber experience modeler of FIGS. 1, 2, and 3.

FIG. 4 illustrated a general vector view, without reference to specific components or metrics. FIG. 5 illustrates a vector view of subscriber metrics 310 as used by some embodiments of subscriber experience modeler 170. In the example of FIG. 5, the sources for metrics include these exemplary network components: subscriber equipment 110, remote access server 210, RADIUS 230, and DNS 220.

The individual service metrics from component X in service space are $\{C_XSS1 \ldots C_XSSn\}$, which can also be represented as a single Dimension $C_XSSD$. The service space vector (SSV) is composed of such dimensions for all N components: $(\{C_1SS1 \ldots C_1SSn\} \ldots \{C_NSS1 \ldots C_NSSn\}$, or $\{C_1SSD \ldots C_NSSD\}$. The metrics for each component are scaled into corresponding Scaled vector Dimensions $\{xC_XSS1 \ldots xC_NSSn\}$. The service space vector (xSSV) is the collection of the scaled dimensions $\{xC_1SSD \ldots xC_NSSD\}$, representing all the components.

The individual degradation metrics obtained from component X which affect component X only $\{C_{XX}DS1 \ldots C_{XX}DSn\}$ are represented as a dimension of the Degradation vector for component X. Similarly, degradation metrics for component X obtained as a result of activity in component Y are represented as another dimension $\{C_{XY}DS1 \ldots C_{XY}DSn\}$. All such dimensions are subsequently scaled to form the Scaled vector ($xC_XDSV$) for component X in degradation space. The dimension of the Degradation vector for component X due to component Y is $\{C_{XY}DS1 \ldots C_{XY}DSn\}$. Thus, the vector $xC_XDSV$ represents degradation of component X as affected by all other components.

The Degradation frequency vector (DFV) is composed of the frequency of degradation events from each network component. Each dimension of this vector consists of the normalized frequency of degradation events associated with the network component: $\{|DDF|, |RDF|, |ADF|, |EDF|\}$.

The degradation space matrix (DSM) is composed of all the scaled Degradation vectors i.e. $\{xC_1DSV \ldots xC_NDSV\}$. The service space vector (xSSV) is composed of all the dimensions (independent influences on a subscriber's experience) in service space: $\{xC_1SSD \ldots xC_NSSD\}$.

The individual metrics contained within these vectors are shown in Table 1.

TABLE 1

| | |
|---|---|
| (DNS service space dimension) | |
| DSS1 | DNS Responsiveness metric |
| DSS2 | DNS Response Quality metric |
| (RADIUS service space dimension) | |
| RSS1 | Static Authentication State |
| RSS2 | Dynamic Authentication State |
| (RAS service space dimension) | |
| ASS1 | Round Trip Time to POP |
| ASS2 | Upstream Loss Ratio to POP |
| ASS3 | Downstream Loss Ration to POP |
| ASS4 | Upstream Bandwidth to POP |
| ASS5 | Downstream Bandwidth to POP |
| ASS6 | Protocols with Connection Breaks |
| (Subscriber Equip. service space dimension) | |
| ESS1 | Malware |
| ESS2 | Network Software |
| (DNS degradation space dimension) | |
| DDS1 | Slow DNS Responses |
| DDS2 | DNS Error Responses |
| (RADIUS degradation space dimension) | |
| RDS1 | RADIUS Accounting Errors |
| RDS2 | RADIUS Error Responses |
| (RAS degradation space dimension) | |
| ADS1 | POP Round Trip Time Degradation |
| ADS2 | POP Upstream Loss Ratio Degradation |
| ADS3 | POP Downstream Loss Ration Degradation |
| ADS4 | POP Upstream Bandwidth Degradation |
| ADS5 | POP Downstream Bandwidth Degradation |
| ADS6 | Protocols Used |
| (Subscriber Equip. degradation space dimension) | |
| EDS1 | CPU Utilization Threshold Events |
| EDS2 | Network Throughput Threshold Events |
| (DNS Degradation Frequency dimension) | |
| DDF1 | Frequency of Slow DNS Responses |
| DDF1 | Frequency of DNS Errors |
| (RADIUS degradation space dimension) | |
| RDF1 | Frequency of RADIUS Accounting Errors |
| RDF2 | Frequency of RADIUS Error Responses |
| (RAS Degradation Frequency dimension) | |
| ADF1 | Frequency of POP Virtual Path Volume Drop |
| ADF2 | Frequency of POP Virtual Path Downstream Loss |
| ADF3 | Frequency of POP Virtual Path Upstream Loss |

Figure 6:
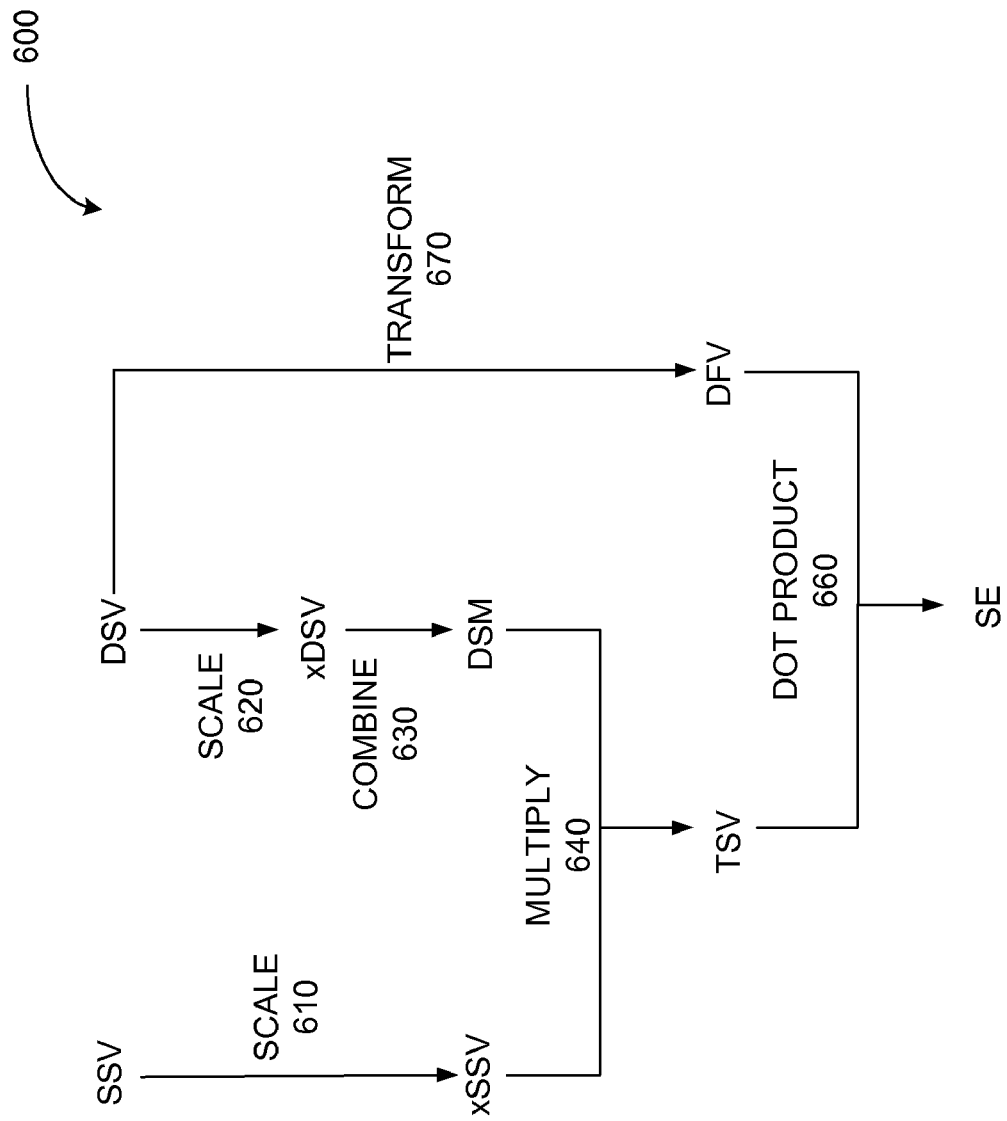
FIG. 6 is a diagram describing an exemplary method implemented by the subscriber experience modeler of FIGS. 1, 2, and 3.

As explained earlier in connection with the data flow diagram of FIG. 3, one embodiment of subscriber experience modeler 170 applies transformations 320 to vector subscriber metrics 310 to produce a single scalar value representing the subscriber experience. FIG. 6 is a diagram describing an exemplary method 600 implemented by subscriber experience modeler 170 to perform this transformation. In the example of FIG. 6, the transformation used is of the bilinear form: two vectors from different spaces are transformed by a matrix. However, other forms of transformation are also possible. The example of FIG. 6 also includes scaling operations, for the reasons described above. However, scaling is not required when the two vectors are comparable without scaling.

The input service space vector dimensions $\{C_1 SSD \ldots C_N SSD\}$, representing the effect of each component on subscriber service, are scaled (operation 610) to capture the effect each metric has on a subscriber experience. The input degradation space vectors for individual components (e.g., $\{C_{11}DS1 \ldots C_{11}DSn\} \ldots \{C_{1N}DS1 \ldots C_{1N}DSn\}$) are also scaled (operation 620) to produce scaled vectors xDSV1 ... xDSVN. The single-dimension scaled vectors xDSV are combined (630) into a two-dimensional degradation space matrix (DSM). The DSM is multiplied by the scaled vector xSSV (operation 640) to produce a translated service space vector (TSSV). A dot product operation (operation 650) is performed on the vector TSSV and a Degradation Frequency vector (DFV) to produce a scalar Subscriber Experience (SE), where the DFV is produced by a transform operation 660 on the vector DSV. The scalar SE produced by the method 600 is a single value representing the subscriber experience.

Figure 7:
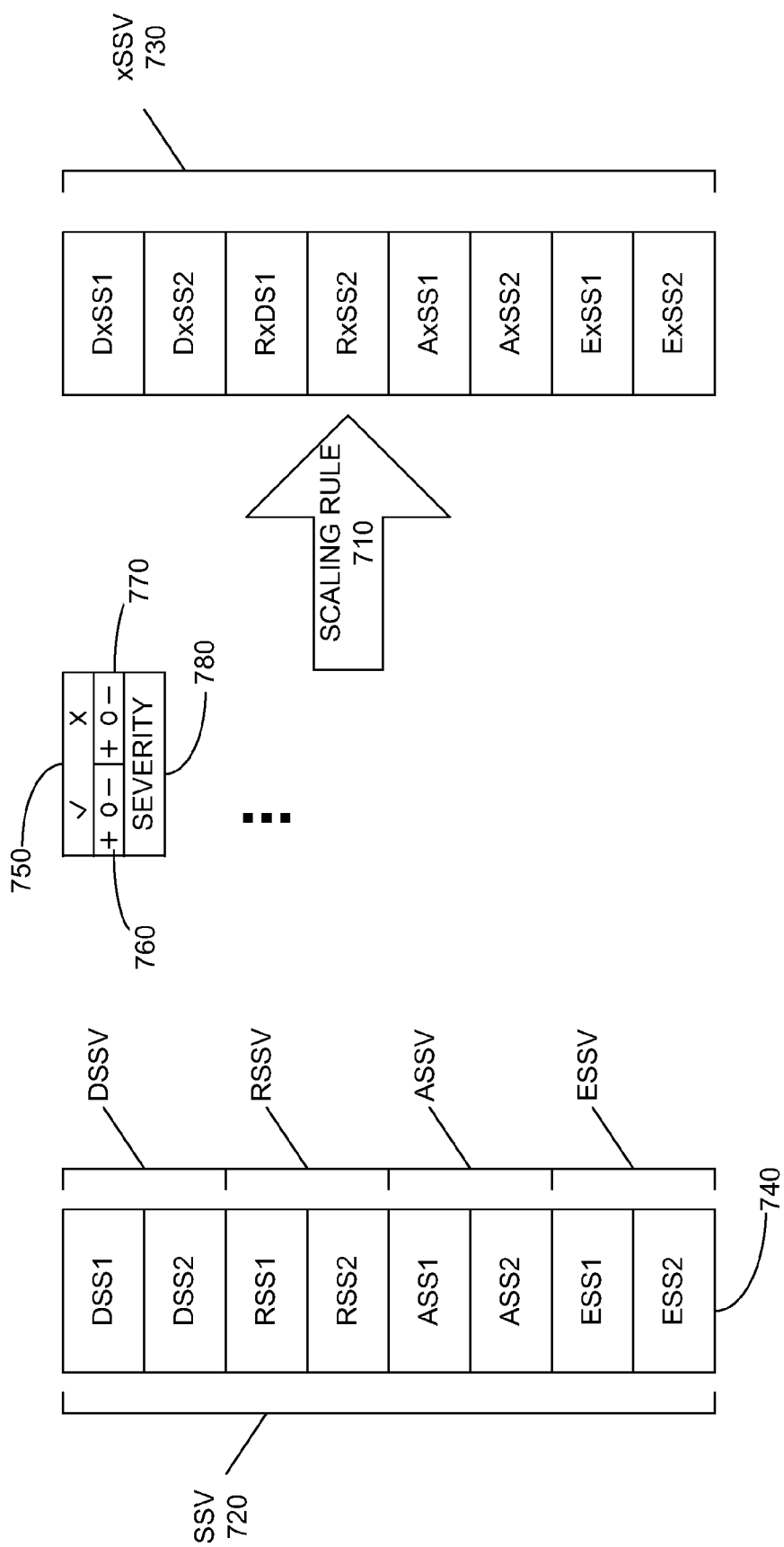
FIG. 7 is a diagram of the service space vector (SSV) scaling operation of FIG. 6.

Several of the operations in FIG. 6 will now be described in more detail. As described earlier, a service metric is a scalar value measuring quality of service delivered by a component or device at a particular time. The scaling operation 620, as illustrated in FIG. 7, takes into account the contribution made by each service metric to the subscriber experience, by applying a scaling rule 710 to service space vector (SSV) 720 to produce a vector xSSV 730. The scaling rule 710 uses data associated with each service metric 740 in SSV 720 to determine the magnitude of the contribution and whether the contribution is positive or negative. (A person of ordinary skill in the art should appreciate that although the term "scaling" is used, the transformation is not limited to multiplying by a scaling factor.)

In computing this contribution, the presence or absence (750) of each possible service metric 740 in SSV 720 is determined. In a given time period, subscriber metrics collector 160 may not collect each of the possible service metrics 740 in SSV 720. Each source (network component or subscriber device) supports a specific set of metrics that it reports to subscriber metrics collector 160. However, the actual metrics collected from a source may not include all possible metrics from that source. As one example, DNS component 220 produces a "Response Code" metric whenever the subscriber uses the DNS. Therefore, the service metrics 740 collected by subscriber metrics collector 160 over a particular time period would not include the "Response Code" metric 210 if the DNS was not used during that time period.

The presence of some service metrics 740 in SSV 720 is expected during normal operating conditions (e.g., a status metric indicating "Protocols Used"). In this case, the service metric 740 has a positive influence when present. The presence of other service metrics 740 signals a problem (e.g., a status metric indicating "Protocols with Connection Breaks"), so that service metric 740 has no influence when absent, and a negative influence when present. Therefore, the scaling rule 710 also uses an influence-when-present attribute 760 and an influence-when-absent attribute 770, where the value of an influence attribute (760, 770) can be positive, none, or negative. Note that these influence attributes (760, 770) are not part of the service metrics 740 received from the subscriber metrics collector 160, but can be considered as part of the scaling rule 710, or as data associated with the scaling rule 710. In contrast, the presence/absence status 750 for service metrics 740 is determined from the service metrics 740 themselves.

Scaling rule 710 combines the presence/absence status 750 with the influence attributes (760, 770) as follows. If a service metric 740 is present in SSV 720 and has a positive influence-when-present attribute 760, then the scaling rule 710 produces a scaled value of 2 for the corresponding metric in xSSV 730. If a service metric 740 is absent from SSV 720 and the influence-when-absent attribute 770 is none, then the rule 710 outputs a scaled value of 0 for the corresponding metric in xSSV 730. If a service metric 740 is present in SSV 720 and the metric has a negative influence-when-present attribute 760, then the rule 710 produces a negative value with a magnitude given by a severity factor 780 also associated with the metric.

For some service metrics 740, the severity factor 780 is equal to the value of the scalar value of the service metric 740. Examples of this type of service metric 740 include the Problem Protocols and Malware metrics in the vector ESSV. The Problem Protocols metric indicates the number of protocols in the subscriber device that have a connectivity problem. Similarly, the Malware metric indicates the number of malware components detected in the subscriber equipment. Thus, if Problem Protocols in SSV 720 had the value of 1, and Malware had the value of 4, the severity factor 780 for these two metrics would be 1 and 4, respectively, and the scaling rule 710 would produce −1 and −4 for the corresponding metrics in xSSV 730.

The severity factor 780 may be different for each possible value of a particular service metric 740. An example of this behavior, for the DNS Response Quality metric, is shown in Table 2.

TABLE 2

DNS Response Quality Metric

| Metric Value | Description | Severity |
|---|---|---|
| 1 | Form Err | 3 |
| 2 | Server Failure | 4 |
| 3 | Non-Existent Domain | 1 |
| 4 | Not Implemented | 2 |
| 5 | Query Refused | 5 |

Metrics of this last type are associated with a degradation threshold. An example of this type of metric is Last DNS Response Time. The magnitude of the scaled output for metrics of this type is proportional to the threshold: (Threshold—Collected Metric)/Threshold. Thus, if the Last DNS Response time metric for a single subscriber has a value of 28 seconds, and the degradation threshold for Last DNS Response Time is 10 seconds, then the scaled output of the for the Last DNS Response metric is −1.8 seconds.

Figure 8:
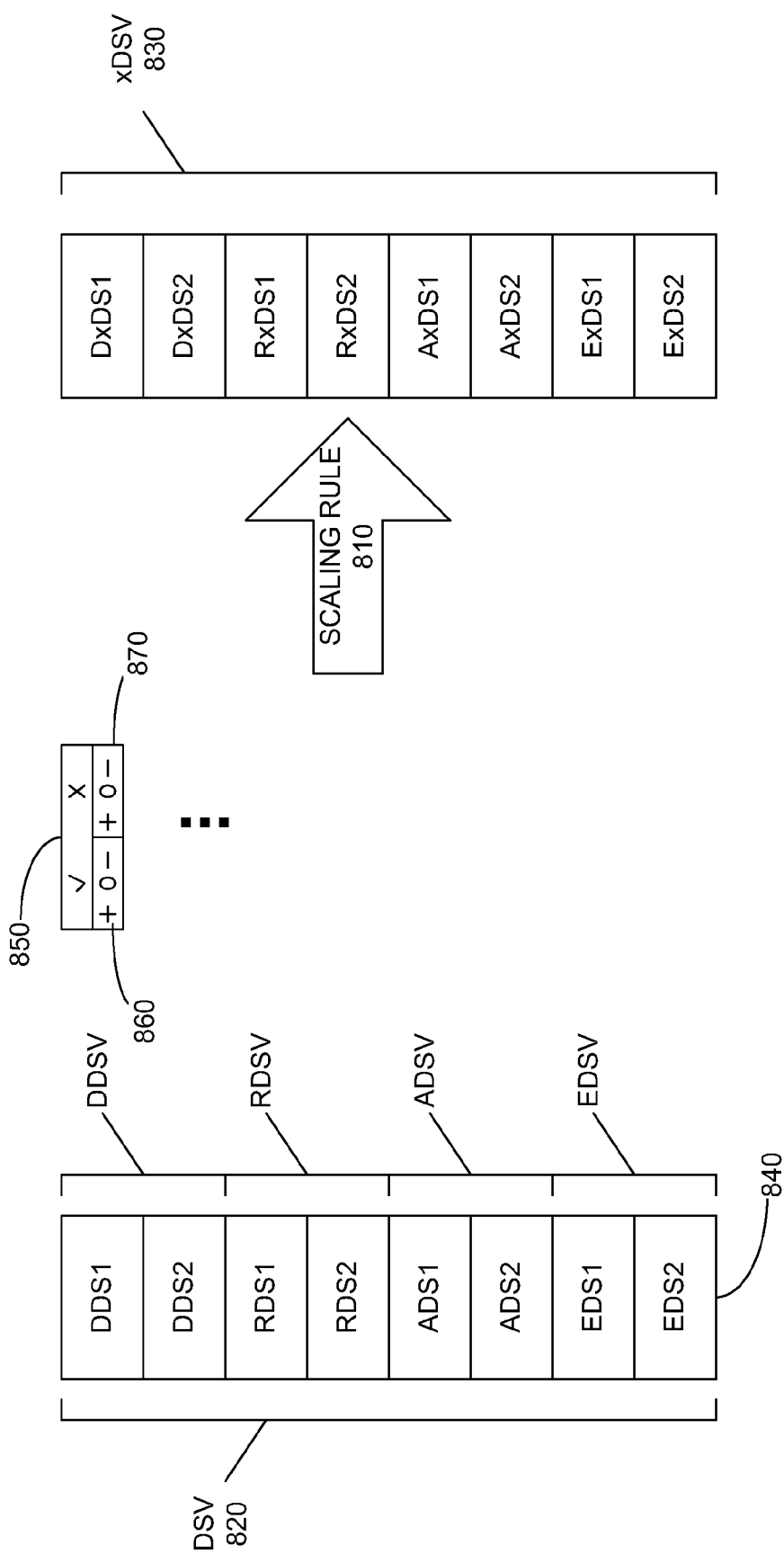
FIG. 8 is a diagram of the degradation space vector (DSV) scaling operation of FIG. 6.

The method 600 of FIG. 6 also includes a scaling operation 620 for the degradation space vector (DSV). As described earlier, a degradation metric is a set of multiple values measuring a decline over time in the quality of service from a component or device. The scaling operation 620, as illustrated in FIG. 8, takes into account the contribution made by each degradation metric to the subscriber experience, by applying a scaling rule 810 to DSV 820 to produce a vector xDSV 830. The scaling rule 810 uses data associated with each degradation metric 840 in DSV 820 to determine the magnitude of the contribution and whether the contribution is positive or negative.

In computing this contribution, the presence or absence (850) of each possible degradation metric 840 in DSV 820 is determined. The scaling rule 810 also uses an influence-when-present attribute 860 and an influence when absent attribute 870. If a degradation metric 840 is present in DSV 820 and has a positive or a zero influence-when-present attribute 860, then the scaling rule 810 produces a scaled value of 1 for the corresponding metric in xDSV 830. If a degradation metric 840 is present in DSV 820 and the metric has a negative influence-when-present attribute 860, then the rule 810 produces a scaled value of 2 for the corresponding metric in xDSV 830.

In this embodiment, degradation space is treated differently than service space. In service space, the absence of a "no effect" metric resulted in a 0 score, and the presence of a "bad" metric resulted in a Negative score proportional to the severity factor. Here, in degradation space, the absence of a "no-effect" or "good" metric results in a +1 and the presence of a "bad" metric results in a +2. This difference is due to the fact that absence of degradation does itself not degrade service. Instead, the value from the DSV/DSM aggravates any service issues the subscriber has. If the subscriber has bad service and the network component is behaving badly, it is twice as bad as opposed to being merely bad.

The method 600 of FIG. 6 also includes a combination operation 630 which produces the degradation space matrix from the set of scaled degradation vectors. This process of creating the DSM will now be described in further detail. When expanded, the DSM appears as $$\begin{array}{cccc} \{C_{11}DS1 \ldots C_{11}DSn\} & \{C_{12}DS1 \ldots C_{12}DSn\} & \{C_{13}DS1 \ldots C_{13}DSn\} & \{C_{14}DS1 \ldots C_{14}DSn\} \\ \{C_{21}DS1 \ldots C_{21}DSn\} & \{C_{22}DS1 \ldots C_{22}DSn\} & \{C_{23}DS1 \ldots C_{13}DSn\} & \{C_{24}DS1 \ldots C_{24}DSn\} \\ \{C_{31}DS1 \ldots C_{31}DSn\} & \{C_{32}DS1 \ldots C_{32}DSn\} & \{C_{33}DS1 \ldots C_{33}DSn\} & \{C_{34}DS1 \ldots C_{34}DSn\} \\ \{C_{41}DS1 \ldots C_{41}DSn\} & \{C_{42}DS1 \ldots C_{42}DSn\} & \{C_{43}DS1 \ldots C_{43}DSn\} & \{C_{44}DS1 \ldots C_{44}DSn\} \end{array}$$

As described above, the non-diagonal components of the degradation space matrix represent the part of the degraded metrics (for the component in question) due to other components. That is, they represent any correlation the component has with other components that provide service to the Subscriber. For the simplest case, assuming no correlation, all values $C_{xy}$ where x< >y will be zero. The resultant degradation space matrix is

| {C₁₁DS1...C₁₁DSn} | 0 | 0 | 0 |
| 0 | {C₂₂DS1...C₂₂DSn} | 0 | 0 |
| 0 | 0 | {C₃₃DS1...C₃₃DSn} | 0 |
| 0 | 0 | 0 | {C₄₄DS1...C₄₄DSn} |

As described earlier in connection with FIG. 5, DSM is composed of degradation space vectors of 4 components—DNS (DxDSV), a RAS DSV (RxDSV), a RADIUS DSV (AxDSV), and an Equipment DSV (ExDSV): {DxDSV, RxDSV, AxDSV, ExDSV}. However, the correlated components of these vectors are zero in the simplest case. Therefore, the resultant DSM produced by operation 630 can be described as

| DxDSV | 0 | 0 | 0 |
| 0 | RxDSV | 0 | 0 |
| 0 | 0 | AxDSV | 0 |
| 0 | 0 | 0 | ExDSV |

The method 600 of FIG. 6 also includes a matrix multiplication operation 640 on xSSV and DSM and a dot product operation 650 on the TSSV and the DFV. However, these matrix operations should be understood by a person of ordinary skill in the art, and will not be discussed further.

Figure 9:
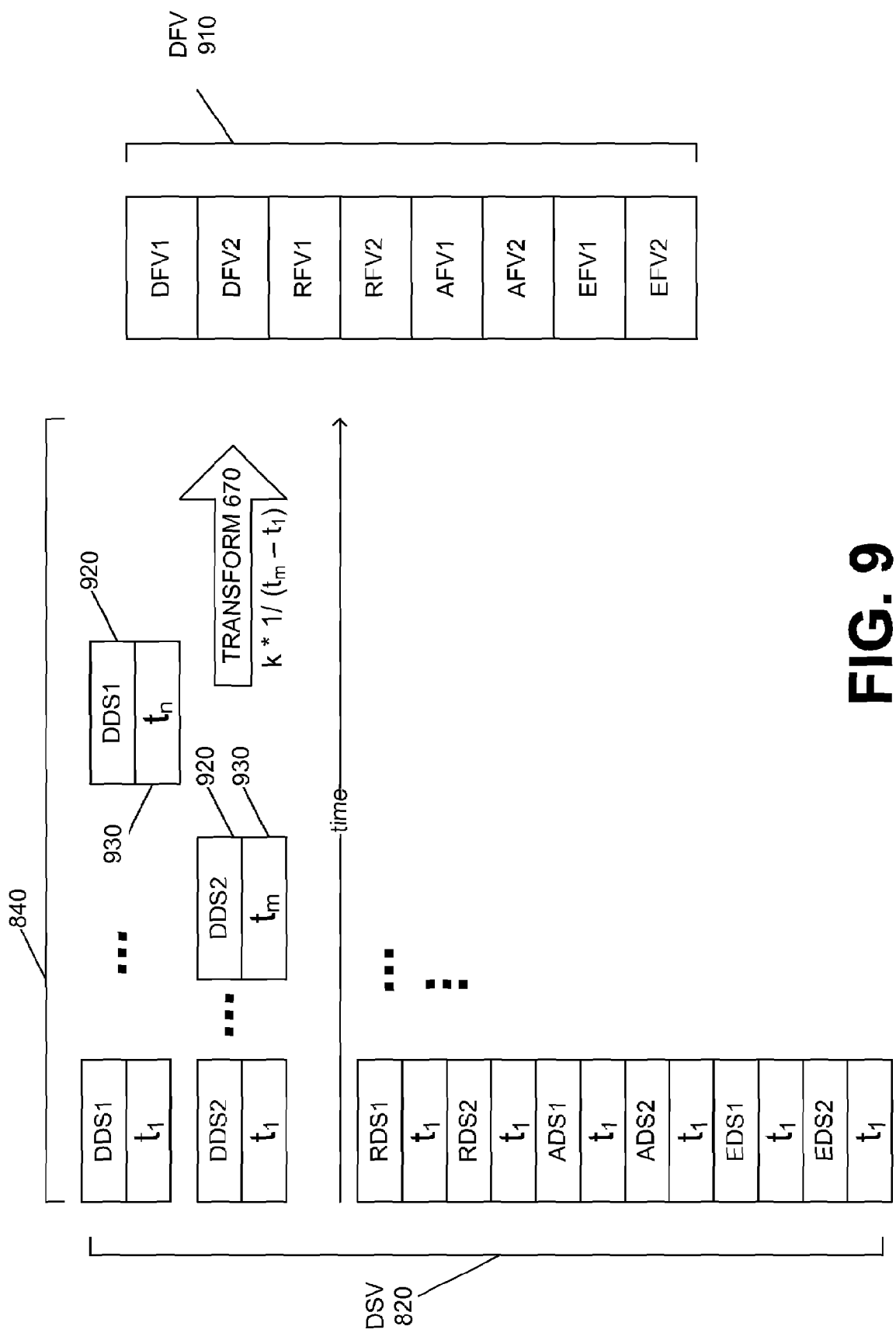
FIG. 9 is a diagram of the transform operation of FIG. 6 which produces a Degradation Frequency vector (DSV).

FIG. 9 illustrates the transform operation 660 of FIG. 6, which uses the scaled degradation space vector (xDSV) of FIG. 5 to produce DFV 910, which is used in the dot product operation 650. As described earlier, DSV contains degradation metrics 840, each of which measures a decline over time in the quality of service from a component or device. A degradation metric 840 includes multiple scalar values (920) and a timestamp (930) for each value. Each degradation metric 840 can contain a different number of scalar values 920. In the example scenario of FIG. 9, degradation metric DDS1 has n values and DDS2 has m values.

Transform operation 660 calculates a frequency for each degradation metric 840 in DSV 820, and stores the frequency in DFV 910. The frequency of a particular degradation metric 840 is the inverse of the difference between the first and last scalar value 920 for that metric 840, multiplied by a unit factor k which depends on the unit used for the frequency. For example, if the frequency in DFV 910 is expressed in MHz, then k is 1000, but if the frequency is expressed in Hz, then k is 1.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method for modeling a subscriber network experience to a network comprising:

receiving, at a computer, a plurality of subscriber metrics associated with a subscriber's access to the network, the metrics measuring quality of service for the subscriber experience with the subscriber's access to the network; and modeling, at the computer, the subscriber experience by applying a transformation to the plurality of subscriber metrics to produce a set of subscriber experience data, where each element of the subscriber experience data quantifies an aspect of the subscriber experience, wherein the plurality of subscriber metrics comprises a plurality of service metrics and a plurality of network degradation metrics, the method further comprising:

translating the plurality of subscriber metrics into at least one subscriber space vector;

translating the plurality of subscriber metrics into at least one degradation space vector; and modeling the subscriber experience by applying a series of transformations to the at least one subscriber space vector and to the at least one degradation space vector to produce a set of subscriber experience data, wherein the at least one subscriber space vector comprises a plurality of subscriber space vectors, and the at least one degradation space vector comprises a plurality of degradation space vectors, and the modeling further comprises:
applying a scaling operation on at least a portion of the service space vectors to produce a plurality of scaled service space vectors;
applying a scaling operation on at least a portion of the degradation space vectors to produce a plurality of scaled degradation space vectors;
combining the scaled degradation space vectors to produce a degradation space matrix;
multiplying the scaled service space vector and the degradation space matrix to produce a translated service space vector;
applying a frequency transform to the degradation space vector to produce a degradation frequency vector; and
calculating the dot product of the translated service space vector and the degradation frequency vector.

2. The method of claim 1, wherein the modeling further comprises:
applying at least one transformation which calculates a contribution made by each of the plurality of subscriber metrics to the subscriber experience.

3. The method of claim 1, wherein the access network comprises a plurality of network components, and the modeling further comprises:
applying at least one transformation which takes into account a correlation between two of the network components.

4. The method of claim 1, wherein the access network comprises a plurality of network components and at least one subscriber device, and the modeling further comprises:
applying at least one transformation which takes into account a correlation between one of the network components and the subscriber device.

5. The method of claim 1, wherein the modeling further comprises:
applying at least one transformation to the plurality of subscriber metrics to produce a subscriber experience score, wherein the subscriber experience score is a scalar value which represents the subscriber experience.

6. The method of claim 1, wherein the modeling further comprises:
applying at least one transformation to the plurality of subscriber metrics to produce a single subscriber experience score, wherein the subscriber experience score is a single scalar value which represents the subscriber experience.

7. The method of claim 1, wherein the modeling further comprises:
applying at least one transformation to the plurality of subscriber metrics to produce a diagnostic report which identifies a suspected root cause of a problem experienced by the subscriber.

8. A non-transitory computer readable medium having a program stored thereon for modeling a subscriber network experience to a network, the program comprising:
receiving a plurality of subscriber metrics associated with a subscriber's access to the network, the metrics measuring quality of service for the subscriber experience with the subscriber's access to the network; and
modeling the subscriber experience by applying a transformation to the plurality of subscriber metrics to produce a set of subscriber experience data, where each element of the subscriber experience data quantifies an aspect of the subscriber experience,
wherein the plurality of subscriber metrics comprises a plurality of service metrics and a plurality of network degradation metrics, the method further comprising:
translating the plurality of subscriber metrics into at least one subscriber space vector:
translating the plurality of subscriber metrics into at least one degradation space vector; and
modeling the subscriber experience by applying a series of transformations to the subscriber space vector and to the degradation space vector to produce a set of subscriber experience data,
wherein the at least one subscriber space vector comprises a plurality of subscriber space vectors, and the at least one degradation space vector comprises a plurality of degradation space vectors, and the modeling further comprises:
applying a scaling operation on at least a portion of the service space vectors to produce a plurality of scaled service space vectors;
applying a scaling operation on at least a portion of the degradation space vectors to produce a plurality of scaled degradation space vectors;
combining the scaled degradation space vectors to produce a degradation space matrix:
multiplying the scaled service space vector and the degradation space matrix to produce a translated service space vector;
applying a frequency transform to the degradation space vector to produce a degradation frequency vector; and
calculating the dot product of the translated service space vector and the degradation frequency vector.

9. The computer readable medium of claim 8, wherein the modeling further comprises:
applying at least one transformation which calculates a contribution made by each of the plurality of subscriber metrics to the subscriber experience.

10. The computer readable medium of claim 8, wherein the access network comprises a plurality of network components, and the modeling further comprises:
applying at least one transformation which takes into account a correlation between two of the network components.

11. The computer readable medium of claim 8, wherein the access network comprises a plurality of network components and at least one subscriber device, and the modeling further comprises:
applying at least one transformation which takes into account a correlation between one of the network components and the subscriber device.

12. The computer readable medium of claim 8, wherein the modeling further comprises:
applying at least one transformation to the plurality of subscriber metrics to produce a subscriber experience score, wherein the subscriber experience score is a scalar value which represents the subscriber experience.

13. The computer readable medium of claim 8, wherein the modeling further comprises:
applying at least one transformation to the plurality of subscriber metrics to produce a single subscriber experience score, wherein the subscriber experience score is a single scalar value which represents the subscriber experience.

14. The computer readable medium of claim 8, wherein the modeling further comprises:

applying at least one transformation to the plurality of subscriber metrics to produce a diagnostic report which identifies a suspected root cause of a problem experienced by the subscriber.

15. A system for modeling a subscriber network experience to a network comprising:

at least one memory having stored thereon program code; and at least one processor programmed by the program code for at least receiving a plurality of subscriber metrics associated with a subscriber's access to the network, the metrics measuring quality of service for the subscriber experience with the subscriber's access to the network; and modeling the subscriber experience by applying a transformation to the plurality of subscriber metrics to produce a set of subscriber experience data, where each element of the subscriber experience data quantifies an aspect of the subscriber experience, wherein the plurality of subscriber metrics comprises a plurality of service metrics and a plurality of network degradation metrics, wherein the at least one processor is further programmed by the program code for at least translating the plurality of subscriber metrics into at least one subscriber space vector:

translating the plurality of subscriber metrics into at least one degradation space vector; and modeling the subscriber experience by applying a series of transformations to the subscriber space vector and to the degradation space vector to produce a set of subscriber experience data, wherein the at least one processor is further programmed by the program code for at least applying a scaling operation on at least a portion of the service space vectors to produce a plurality of scaled service space vectors;

applying a scaling operation on at least a portion of the degradation space vectors to produce a plurality of scaled degradation space vectors;

combining the scaled degradation space vectors to produce a degradation space matrix:

multiplying the scaled service space vector and the degradation space matrix to produce a translated service space vector;

applying a frequency transform to the degradation space vector to produce a degradation frequency vector; and calculating the dot product of the translated service space vector and the degradation frequency vector.

16. The system of claim 15, wherein the at least one processor is further programmed by the program code for at least applying at least one transformation which calculates a contribution made by each of the plurality of subscriber metrics to the subscriber experience.

17. The system of claim 15, wherein the access network comprises a plurality of network components, and wherein the at least one processor is further programmed by the program code for at least applying at least one transformation which takes into account a correlation between two of the network components.

18. The system of claim 15, wherein the access network comprises a plurality of network components and at least one subscriber device, wherein the at least one processor is further programmed by the program code for at least applying at least one transformation which takes into account a correlation between one of the network components and the subscriber device.

19. The system of claim 15, wherein the at least one processor is further programmed by the program code for at least applying at least one transformation to the plurality of subscriber metrics to produce a subscriber experience score, wherein the subscriber experience score is a scalar value which represents the subscriber experience.

20. The system of claim 15, wherein the at least one processor is further programmed by the program code for at least applying at least one transformation to the plurality of subscriber metrics to produce a single subscriber experience score, wherein the subscriber experience score is a single scalar value which represents the subscriber experience.

21. The system of claim 15, wherein the at least one processor is further programmed by the program code for at least applying at least one transformation to the plurality of subscriber metrics to produce a diagnostic report which identifies a suspected root cause of a problem experienced by the subscriber.

* * * * *